US012291395B2

(12) United States Patent
Williams et al.

(10) Patent No.: US 12,291,395 B2
(45) Date of Patent: May 6, 2025

(54) REFUSE COLLECTION VEHICLE POSITIONING

(71) Applicant: The Heil Co., Chattanooga, TN (US)

(72) Inventors: Robert B. Williams, Albertville, AL (US); Stanley L. Maroney, Attalla, AL (US)

(73) Assignee: The Heil Co., Chattanooga, TN (US)

( * ) Notice: Subject to any disclaimer, the term of this patent is extended or adjusted under 35 U.S.C. 154(b) by 0 days.

(21) Appl. No.: 18/179,244

(22) Filed: Mar. 6, 2023

(65) Prior Publication Data

US 2023/0202752 A1 Jun. 29, 2023

Related U.S. Application Data

(63) Continuation of application No. 16/856,934, filed on Apr. 23, 2020, now Pat. No. 11,603,265.

(60) Provisional application No. 62/837,595, filed on Apr. 23, 2019.

(51) Int. Cl.

| | |
|---|---|
| ***B65F 3/04*** | (2006.01) |
| ***B65F 3/02*** | (2006.01) |
| *B66F 9/075* | (2006.01) |

(52) U.S. Cl.

CPC ........ *B65F 3/043* (2013.01); *B65F 2003/025* (2013.01); *B65F 2003/0279* (2013.01); *B65F 2003/0283* (2013.01); *B66F 9/0755* (2013.01)

(58) Field of Classification Search

CPC ................ B65F 3/043; B65F 2003/025; B65F 2003/0279; B65F 2003/0283; B66F 9/0755

See application file for complete search history.

(56) References Cited

U.S. PATENT DOCUMENTS

| | | |
|---|---|---|
| 2,949,199 A | 8/1960 | Jones |
| 4,279,328 A | 7/1981 | Ahlbom |
| 4,868,796 A | 9/1989 | Ahrens et al. |
| 5,004,392 A | 4/1991 | Naab |
| 5,007,786 A | 4/1991 | Bingman |
| 5,215,423 A | 6/1993 | Schulte-Hinsken et al. |
| 5,601,392 A | 2/1997 | Smith et al. |
| 5,755,547 A | 5/1998 | Flerchinger et al. |

(Continued)

FOREIGN PATENT DOCUMENTS

| | | |
|---|---|---|
| EP | 0214453 | 3/1987 |
| EP | 0955252 | 11/1999 |

(Continued)

OTHER PUBLICATIONS

EagleVisionSystems.com, “Bin-Seeker,” 2017, retrieved from <http://eaglevisionsystems.com/EagleVision Bin-Seeker Datasheet.pdf>, 3 pages.

(Continued)

*Primary Examiner* — James Keenan

(74) *Attorney, Agent, or Firm* — Fish & Richardson P.C.

(57) ABSTRACT

A refuse collection vehicle includes a fork assembly that is operable to engage one or more fork pockets of a refuse container, a lift arm that is operable to lift a refuse container, and at least one sensor that is configured to collect data indicating a position of the one or more fork pockets of the refuse container. A position of at least one of the fork assembly or the lift arm is adjusted in response to the data collected by the at least one sensor.

20 Claims, 7 Drawing Sheets

(56) References Cited

U.S. PATENT DOCUMENTS

| | | | |
|---|---|---|---|
| 5,762,461 | A | 6/1998 | Fröhlingsdorf |
| 5,851,100 | A | 12/1998 | Brandt |
| 5,938,710 | A | 8/1999 | Lanza et al. |
| 5,967,731 | A | 10/1999 | Brandt |
| 6,004,092 | A | 12/1999 | Johnson et al. |
| 6,152,673 | A | 11/2000 | Anderson et al. |
| 6,476,855 | B1 * | 11/2002 | Yamamoto ............. H04N 7/181 348/E7.086 |
| 6,520,008 | B1 | 2/2003 | Stragier |
| 7,070,382 | B2 | 7/2006 | Pruteanu et al. |
| 7,072,745 | B2 | 7/2006 | Pillar et al. |
| 7,219,769 | B2 | 5/2007 | Yamanouchi et al. |
| 7,980,808 | B2 | 7/2011 | Chilson et al. |
| 8,322,968 | B1 * | 12/2012 | Mizner ............... B66F 9/07563 414/24.5 |
| 8,753,062 | B2 | 6/2014 | Curotto |
| 8,833,823 | B2 | 9/2014 | Price et al. |
| 9,296,326 | B1 | 3/2016 | Young |
| 9,403,278 | B1 | 8/2016 | Van Kampen et al. |
| 9,580,014 | B2 | 2/2017 | Lucas et al. |
| 9,635,346 | B2 | 4/2017 | Iida |
| 9,926,135 | B2 | 3/2018 | Whitfield, Jr. et al. |
| 10,048,398 | B2 | 8/2018 | Rose et al. |
| 10,196,206 | B2 | 2/2019 | Whitfield, Jr. et al. |
| 10,661,986 | B2 | 5/2020 | Price et al. |
| 10,831,201 | B2 | 11/2020 | Spence |
| 10,974,895 | B2 | 4/2021 | McNeilus et al. |
| 11,318,885 | B2 * | 5/2022 | Phillips ................... B60R 11/04 |
| 11,453,550 | B2 | 9/2022 | Maroney et al. |
| 11,603,265 | B2 | 3/2023 | Williams et al. |
| 11,608,226 | B2 | 3/2023 | Maroney et al. |
| 11,807,450 | B2 | 11/2023 | Lewis et al. |
| 11,858,735 | B2 | 1/2024 | Maroney et al. |
| 2002/0159870 | A1 | 10/2002 | Pruteanu et al. |
| 2003/0031543 | A1 | 2/2003 | Elbrink |
| 2006/0061481 | A1 | 3/2006 | Kurple et al. |
| 2008/0089764 | A1 | 4/2008 | Vistro |
| 2008/0199298 | A1 | 8/2008 | Chilson et al. |
| 2009/0114485 | A1 | 5/2009 | Eggert |
| 2009/0271058 | A1 | 10/2009 | Chilson |
| 2013/0039728 | A1 | 2/2013 | Price et al. |
| 2015/0093221 | A1 | 4/2015 | Parker |
| 2016/0355335 | A1 | 12/2016 | Whitfield, Jr. et al. |
| 2017/0243369 | A1 | 8/2017 | Iida et al. |
| 2017/0362030 | A1 | 12/2017 | Steimel |
| 2017/0369242 | A1 | 12/2017 | McNeilus et al. |
| 2018/0089517 | A1 * | 3/2018 | Douglas ................. G06V 20/56 |
| 2018/0134531 | A1 | 5/2018 | Tanaka et al. |
| 2018/0319640 | A1 | 11/2018 | Flenoid |
| 2018/0319642 | A1 | 11/2018 | Pronger et al. |
| 2018/0346241 | A1 | 12/2018 | Errington et al. |
| 2019/0135599 | A1 | 5/2019 | Myers et al. |
| 2019/0225422 | A1 | 7/2019 | Wrigley et al. |
| 2019/0325220 | A1 | 10/2019 | Wildgrube et al. |
| 2020/0247609 | A1 | 8/2020 | Maroney et al. |
| 2020/0339345 | A1 | 10/2020 | Lewis et al. |
| 2020/0339346 | A1 | 10/2020 | Maroney et al. |
| 2020/0339347 | A1 | 10/2020 | Williams et al. |
| 2020/0342240 | A1 | 10/2020 | Szoke-Sieswerda et al. |
| 2022/0106113 | A1 | 4/2022 | Lewis et al. |
| 2022/0234822 | A1 | 7/2022 | Maroney et al. |
| 2022/0258966 | A1 | 8/2022 | Maroney et al. |
| 2023/0242336 | A1 | 8/2023 | Maroney et al. |
| 2024/0034555 | A1 | 2/2024 | Lewis et al. |

FOREIGN PATENT DOCUMENTS

| | | |
|---|---|---|
| EP | 1020375 | 7/2000 |
| EP | 3284704 | 2/2018 |
| FR | 3045027 | 6/2017 |
| JP | H09-208199 | 8/1997 |
| JP | H09-210594 | 8/1997 |
| JP | 2009-241247 | 10/2009 |
| JP | 2016-068233 | 5/2016 |
| JP | 2017-178567 | 10/2017 |
| KR | 10-0846313 | 7/2008 |
| WO | WO 2013055309 | 4/2013 |
| WO | WO 2018009961 A1 | 1/2018 |
| WO | WO 2020163383 | 8/2020 |

OTHER PUBLICATIONS

EagleVisionSystems.com, "Vision Systems," Aug. 2015, retrieved from URL <http://eaglevisionsystems.com/vision.html>, 1 page.

EP Search Report in European Appln. No. 20752428.1, dated Feb. 25, 2022, 14 pages.

Extended European Search Report in European Appln. No. 20795932.1, dated May 13, 2022, 10 pages.

PCT International Search Report and Written Opinion in International Application No. PCT/US2020/016648, dated Jun. 3, 2020, 11 pages.

PCT International Search Report and Written Opinion in International Application No. PCT/US2020/029637, dated Jul. 24, 2020, 11 pages.

PCT International Search Report and Written Opinion in International Application No. PCT/US2020/029639, dated Jul. 29, 2020, 11 pages.

PCT International Search Report and Written Opinion in International Application No. PCT/US2020/029646, dated Jul. 29, 2020, 10 pages.

Office Action in European Appln. No. 20795932.1, mailed on Mar. 25, 2024, 7 pages.

Office Action in Australian Appln. No. 2020219848, mailed on Dec. 5, 2024, 4 pages.

Office Action in Canadian Appln. No. 3,129,088 mailed on Sep. 23, 2024, 4 pages.

Office Action in Mexican Appln. No. MX/a/2021/009353 mailed on Nov. 6, 2024, 6 pages (with English machine translation).

Mohamed et al., "Detection and Tracking of Pallets using a Laser Rangefinder and Machine Learning Techniques," HAL Open Science, Robotics, Sep. 2017, 77 pages.

* cited by examiner

REFUSE COLLECTION VEHICLE POSITIONING

CROSS-REFERENCE TO RELATED APPLICATIONS

This application is a continuation of U.S. patent application Ser. No. 16/856,934, entitled "Refuse Collection Vehicle Positioning," filed Apr. 23, 2020, which claims the benefit under 35 U.S.C. § 119(e) of U.S. Patent Application No. 62/837,595, entitled "Refuse Collection Vehicle Positioning," filed Apr. 23, 2019, which are incorporated herein by reference in their entirety.

TECHNICAL FIELD

This disclosure relates to systems and methods for operating a refuse collection vehicle to engage a refuse container.

BACKGROUND

Refuse collection vehicles have been used for generations for the collection and transfer of waste. Traditionally, collection of refuse with a refuse collection vehicle required two people: (1) a first person to drive the vehicle and (2) a second person to pick up containers containing waste and dump the waste from the containers into the refuse collection vehicle. Technological advances have recently been made to reduce the amount of human involvement required to collect refuse. For example, some refuse collection vehicles include features that allow for collection of refuse with a single operator, such as mechanical or robotic lift arms.

SUMMARY

Many aspects of the disclosure feature operating a mechanical lift arm and fork assembly to perform refuse collection.

In an example implementation, a refuse collection vehicle includes a fork assembly that is operable to engage one or more fork pockets of a refuse container, a lift arm that is operable to lift a refuse container, and at least one sensor that is configured to collect data indicating a position of the one or more fork pockets of the refuse container. A position of at least one of the fork assembly or the lift arm is adjusted in response to the data collected by the at least one sensor.

In an aspect combinable with the example implementation, adjusting the position of at least one of the fork assembly or the lift arm in response to the data collected by the at least one sensor includes adjusting a relative positioning of the lift arm.

In another aspect combinable with any of the previous aspects, adjusting the position of at least one of the fork assembly or the lift arm in response to the data collected by the at least one sensor includes adjusting an angular position of one or more forks of the fork assembly.

In another aspect combinable with any of the previous aspects, adjusting the position of at least one of the fork assembly or the lift arm in response to the data collected by the at least one sensor includes aligning one or more ends of one or more forks of the fork assembly with the position of the one or more fork pockets.

In another aspect combinable with any of the previous aspects, adjusting the position of at least one of the fork assembly or the lift arm in response to the data collected by the at least one sensor includes aligning the center of one or more ends of one or more forks of the fork assembly with the center of the one or more fork pockets.

In another aspect combinable with any of the previous aspects, the at least one sensor is a camera.

In another aspect combinable with any of the previous aspects, the at least one sensor is an analog ultrasonic sensor.

Another aspect combinable with any of the previous aspects further includes at least one sensor that is arranged to collect data indicating an angular position of the fork assembly, at least one sensor that is arranged to collect data indicating a relative positioning of the lift arm, and an onboard computing device coupled to the at least one sensor arranged to collect data indicating an angular position of the fork assembly and the at least one sensor arranged to collect data indicating a relative positioning of the lift arm.

In another aspect combinable with any of the previous aspects, adjusting the position of at least one of the fork assembly or the lift arm in response to the data collected by the at least one sensor includes determining, by the onboard computing device, a relative positioning of the lift arm based on data provided by the at least one sensor arranged to collect data indicating a relative positioning of the lift arm, determining, by the onboard computing device, a height of one or more ends of one or more forks of the fork assembly based on the relative positioning of the lift arm, determining, by the onboard computing device, an amount and a direction of travel of the lift arm required to align the one or more ends of the one or more forks with the one or more fork pockets based on the height of the one or more ends of the one or more forks and the position of the one or more fork pockets, and moving the lift arm in the determined amount and the determined direction of travel.

In another aspect combinable with any of the previous aspects, adjusting the position of at least one of the fork assembly or the lift arm in response to the data collected by the at least one sensor includes determining, by the onboard computing device, an angular position of one or more forks of the fork assembly based on data provided by the at least one sensor arranged to collect data indicating angular position of the fork assembly, determining, by the onboard computing device, an amount and a direction of rotation of the fork assembly required to align the one or more forks of the fork assembly with the fork pockets based on the angular position of one or more forks of the fork assembly and the position of the one or more fork pockets, and rotating the fork assembly in the determined amount and the determined direction of rotation.

Potential benefits of the one or more implementations described in the present specification may include increased waste collection efficiency and reduced operator error in refuse collection. The one or more implementations may also reduce the likelihood of damaging refuse containers and refuse collection vehicles during the refuse collection process.

It is appreciated that methods in accordance with the present specification may include any combination of the aspects and features described herein. That is, methods in accordance with the present specification are not limited to the combinations of aspects and features specifically described herein, but also include any combination of the aspects and features provided.

The details of one or more implementations of the subject matter described in this disclosure are set forth in the accompanying drawings and the description below. Other features, objects, and advantages of the subject matter will be apparent from the description and drawings, and from the claims.

DETAILED DESCRIPTION

Figure 1:
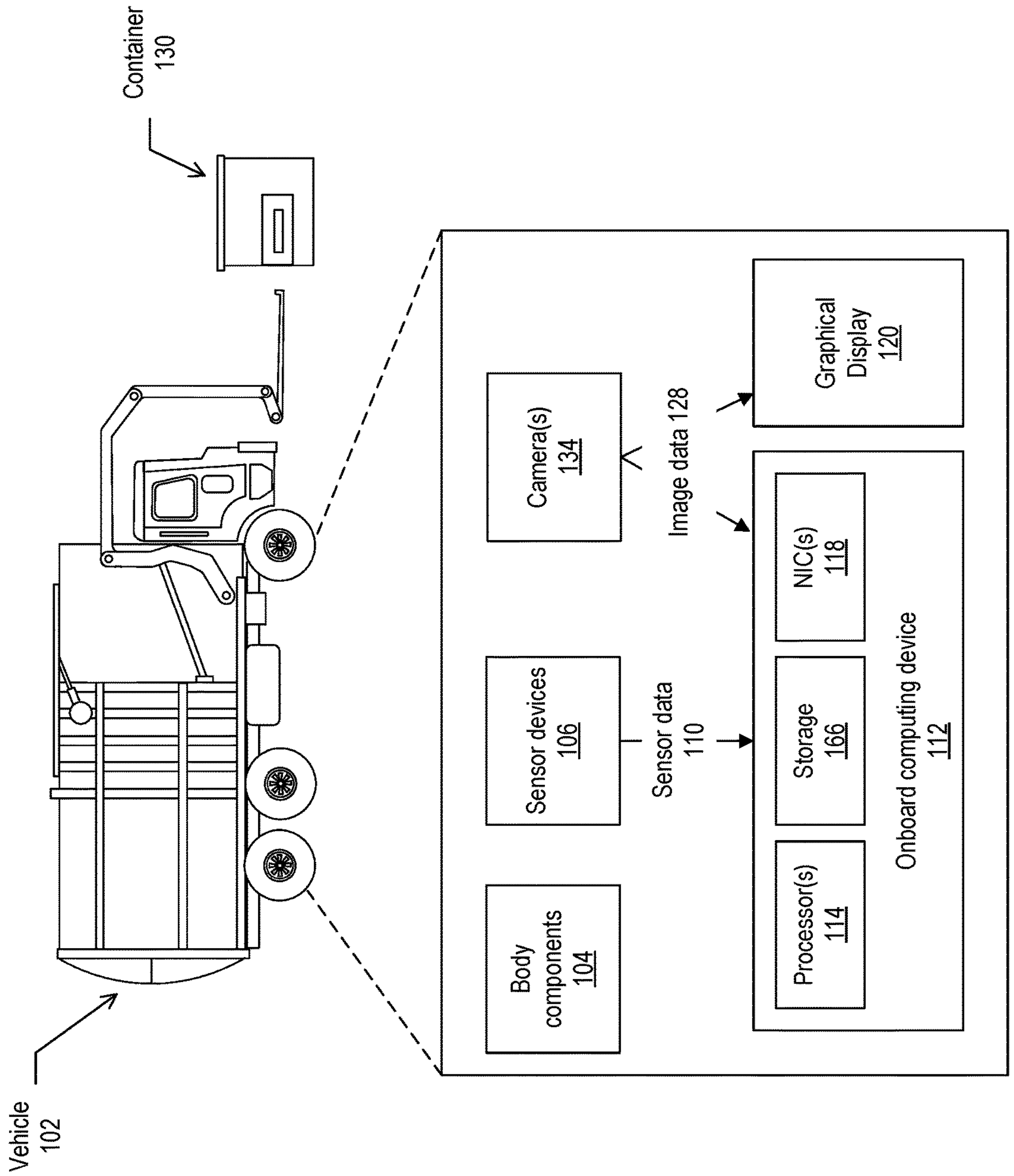
FIG. 1 depicts an example system for collecting refuse.

FIG. 1 depicts an example system for collection of refuse. Vehicle 102 is a refuse collection vehicle that operates to collect and transport refuse (e.g., garbage). The refuse collection vehicle 102 can also be described as a garbage collection vehicle, or garbage truck. The vehicle 102 is configured to lift containers 130 that contain refuse, and empty the refuse in the containers into a hopper of the vehicle 102, to enable transport of the refuse to a collection site, compacting of the refuse, and/or other refuse handling activities.

The body components 104 of the vehicle 102 can include various components that are appropriate for the particular type of vehicle 102. For example, a garbage collection vehicle may be a truck with an automated side loader (ASL). Alternatively, the vehicle may be a front-loading truck, a rear loading truck, a roll off truck, or some other type of garbage collection vehicle. A vehicle with an ASL may include body components 104 involved in the operation of the ASL, such as an arm and/or grabbers, as well as other body components such as a pump, a tailgate, a packer, and so forth. A front-loading vehicle, such as the example shown in FIG. 2, may include body components 104 such as a pump, tailgate, packer, fork assembly, commercial grabbers, and so forth. A rear loading vehicle may include body components 104 such as a pump, blade, tipper, and so forth. A roll off vehicle may include body components such as a pump, hoist, cable, and so forth. Body components 104 may also include other types of components that operate to bring garbage into a hopper of a truck, compress and/or arrange the garbage in the vehicle, and/or expel the garbage from the vehicle.

The vehicle 102 can include any number of body sensor devices 106 that sense body component(s) 104 and generate sensor data 110 describing the operation(s) and/or the operational state of various body components. The body sensor devices 106 are also referred to as sensor devices, or sensors. Sensors may be arranged in the body components, or in proximity to the body components, to monitor the operations of the body components. The sensors 106 emit signals that include the sensor data 110 describing the body component operations, and the signals may vary appropriately based on the particular body component being monitored. Sensors may also be arranged to provide sensor data 110 describing the position of external objects, such as a refuse container.

Sensors 106 can be provided on the vehicle body to evaluate cycles and/or other parameters of various body components. For example, as described in further detail herein, the sensors 106 can detect and/or measure the particular position and/or operational state of body components such a lift arm, a fork assembly, and so forth.

Sensors 106 can include, but are not limited to, an analog sensor, a digital sensor, a CAN bus sensor, a magnetostrictive sensor, a radio detection and ranging (RADAR) sensor, a light detection and ranging (LIDAR) sensor, a laser sensor, an ultrasonic sensor, an infrared (IR) sensor, a stereo camera sensor, a three-dimensional (3D) camera, in-cylinder sensors, or a combination thereof.

In some implementations, the sensor data 110 may be communicated from the sensors to an onboard computing device 112 in the vehicle 102. In some instances, the onboard computing device is an under-dash device (UDU), and may also be referred to as the Gateway. Alternatively, the device 112 may be placed in some other suitable location in or on the vehicle. The sensor data may be communicated from the sensors to the onboard computing device 112 over a wired connection (e.g., an internal bus) and/or over a wireless connection. In some implementations, a Society of Automotive Engineers standard J1939 bus in conformance with International Organization of Standardization (ISO) standard 11898 connects the various sensors with the onboard computing device. In some implementations, a Controller Area Network (CAN) bus connects the various sensors with the onboard computing device. For example, a CAN bus in conformance with ISO standard 11898 can connect the various sensors with the onboard computing device. In some implementations, the sensors may be incorporated into the various body components. Alternatively, the sensors may be separate from the body components. In some implementations, the sensors digitize the signals that communicate the sensor data before sending the signals to the onboard computing device, if the signals are not already in a digital format.

The analysis of the sensor data 110 is performed at least partly by the onboard computing device 112, e.g., by processes that execute on the processor(s) 114. For example, the onboard computing device 112 may execute processes that perform an analysis of the sensor data 110 to determine the current position of the body components, such as the lift arm position or the fork assembly position. In some implementations, an onboard program logic controller or an onboard mobile controller perform analysis of the sensor data 110 to determine the current position of the body components 104.

The onboard computing device 112 can include one or more processors 114 that provide computing capacity, data storage 166 of any suitable size and format, and network interface controller(s) 118 that facilitate communication of the device 112 with other device(s) over one or more wired or wireless networks.

In some implementations, a vehicle includes a body controller that manages and/or monitors various body components of the vehicle. The body controller of a vehicle can be connected to multiple sensors in the body of the vehicle. The body controller can transmit one or more signals over the J1939 network, or other wiring on the vehicle, when the body controller senses a state change from any of the sensors. These signals from the body controller can be received by the onboard computing device 112 that is monitoring the J1939 network.

In some implementations, the onboard computing device 112 is a multi-purpose hardware platform. The device can include a under dash unit (UDU) and/or a window unit (WU) (e.g., camera) to record video and/or audio operational activities of the vehicle. The onboard computing device hardware subcomponents can include, but are not limited to, one or more of the following: a CPU, a memory or data storage unit, a CAN interface, a CAN chipset, NIC(s) such as an Ethernet port, USB port, serial port, I2c lines(s), and so forth, I/O ports, a wireless chipset, a global positioning system (GPS) chipset, a real-time clock, a micro SD card, an audio-video encoder and decoder chipset, and/or external wiring for CAN and for I/O. The device can also include temperature sensors, battery and ignition voltage sensors, motion sensors, CAN bus sensors, an accelerometer, a gyroscope, an altimeter, a GPS chipset with or without dead reckoning, and/or a digital can interface (DCI). The DCI cam hardware subcomponent can include the following: CPU, memory, can interface, can chipset, Ethernet port, USB port, serial port, I2c lines, I/O ports, a wireless chipset, a GPS chipset, a real-time clock, and external wiring for CAN and/or for I/O. In some implementations, the onboard computing device is a smartphone, tablet computer, and/or other portable computing device that includes components for recording video and/or audio data, processing capacity, transceiver(s) for network communications, and/or sensors for collecting environmental data, telematics data, and so forth.

In some implementations, one or more cameras 134 can be mounted on the vehicle 102 or otherwise present on or in the vehicle 102. The camera(s) 134 each generate image data 128 that includes one or more images of a scene external to and in proximity to the vehicle 102. In some implementations, one or more cameras 134 are arranged to capture image(s) and/or video of a container 130 before, after, and/or during the operations of body components 104 to engage and empty a container 130. For example, for a front-loading vehicle, the camera(s) 134 can be arranged to image objects in front of the vehicle 102. As another example, for a side loading vehicle, the camera(s) 134 can be arranged to image objects to the side of the vehicle, such as a side that mounts the ASL to lift containers. In some implementations, camera(s) 134 can capture video of a scene external to, internal to, and in proximity to the vehicle 102.

In some implementations, the camera(s) 134 are communicably coupled to a graphical display 120 to communicate images and/or video captured by the camera(s) 134 to the graphical display 120. In some implementations, the graphical display 120 is placed within the interior of the vehicle. For example, the graphical display 120 can be placed within the cab of vehicle 102 such that the images and/or video can be viewed by an operator of the vehicle 102 on a screen 122 of the graphical display 120. In some implementations, the graphical display 120 is a heads-up display that projects the images and/or video captured by the camera(s) 134 onto the windshield of the vehicle 102 for viewing by an operator of the vehicle 102. In some implementations, the images and/or video captured by the camera(s) 134 can be communicated to a graphical display 120 of the onboard computing device 112 in the vehicle 102. Images and/or video captured by the camera(s) 134 can be communicated from the sensors to the onboard computing device 112 over a wired connection (e.g., an internal bus) and/or over a wireless connection. In some implementations, a network bus (e.g., a J1939 network bus, a CAN network bus, etc.) connects the camera(s) with the onboard computing device 112. In some implementations, the camera(s) are incorporated into the various body components. Alternatively, the camera(s) may be separate from the body components.

Figure 2:
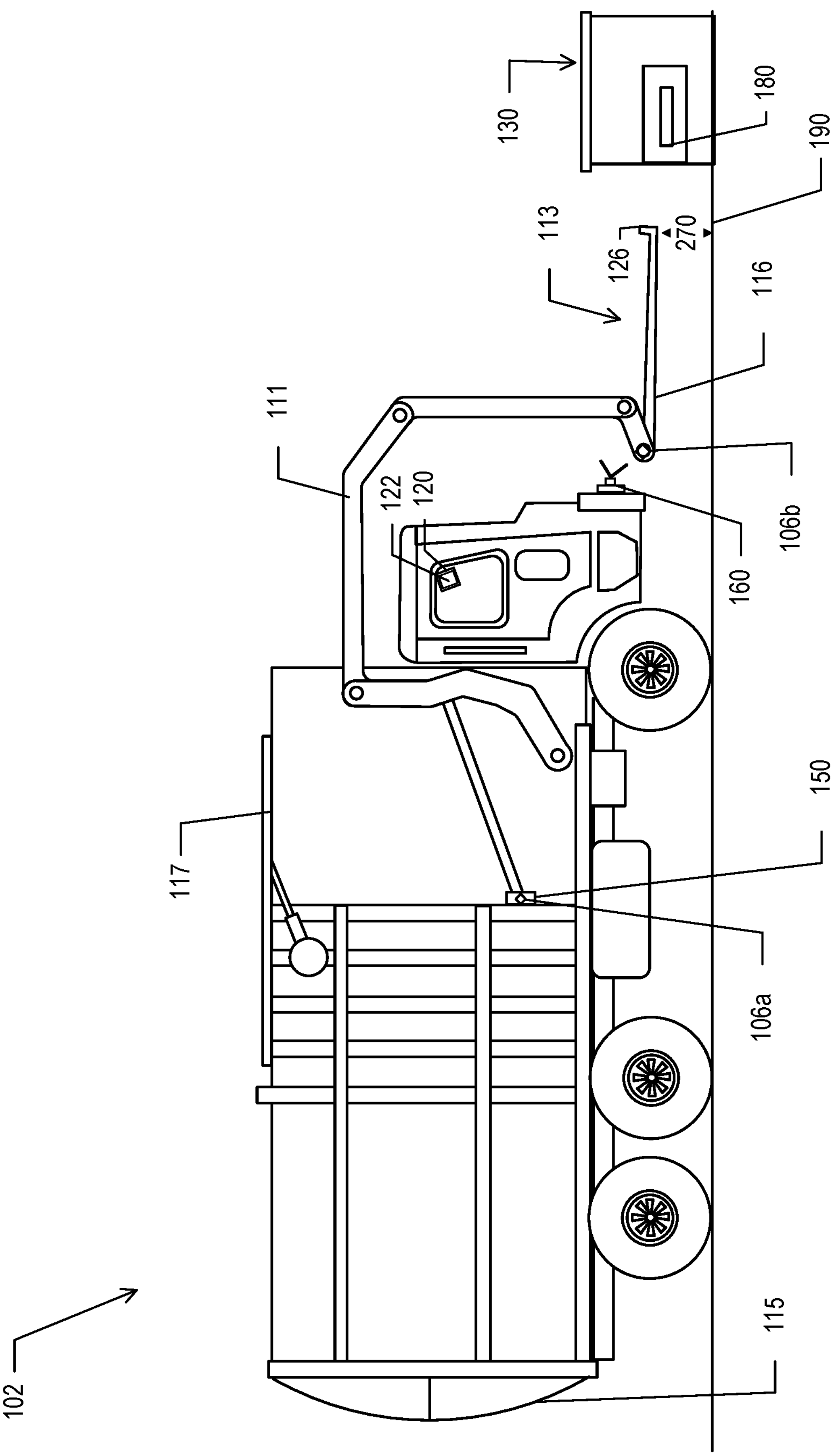
FIG. 2 depicts an example schematic of a refuse collection vehicle.

FIG. 2 depicts an example schematic of a refuse collection vehicle. As shown in the example of FIG. 2, the vehicle 102 includes various body components 104 including, but not limited to: a lift arm 111, a fork assembly 113, a back gate or tailgate 115, and a hopper 117 to collect refuse for transportation.

One or more position sensors 106 can be situated to determine the state and/or detect the operations of the body components 104.

In the example shown, the vehicle 102 includes position sensors 106*a*, 106*b* that are arranged to detect the position of the lift arm 111 and/or the forks 113. For example, the position sensors 106*a*, 106*b* can provide data about the current position of the lift arm 111 and the fork 113, respectively, relative to the surface 190 on which the vehicle 102 is positioned, which, as described in further detail herein, can be used to determine any adjustments to the lift arm 111 position necessary to engage a refuse container 130.

Position sensors 106*a*, 106*b* can include, but are not limited to, an analog sensor, a digital sensor, a CAN bus sensor, a magnetostrictive sensor, a RADAR sensor, a LIDAR sensor, a laser sensor, an ultrasonic sensor, an infrared (IR) sensor, a stereo camera sensor, a three-dimensional (3D) camera, in-cylinder sensors, or a combination thereof.

In some implementations, the position sensors are located in one or more cylinders of the refuse collection vehicle 102. In some examples, a first position sensor 106*a* is located inside a cylinder 150 used for raising the lift arm 111 and a second position sensor (not shown) is located inside a cylinder used for moving the fork assembly 113 (not shown). In some implementations, position sensor 106*a* is located on the outside of a housings containing the cylinder 150 coupled to the lift arm 111. In some examples, the position sensors, such as sensor 106*a*, are in-cylinder, magnetostrictive sensors.

In some implementations, the position sensors (e.g., sensor 106*a*) include one or more radar sensors inside one or more cylinders of the lift arm 111 and/or fork assembly 113. In some examples, the position sensors coupled to a cylinder of the vehicle 102 (e.g., sensor 106*a* coupled to cylinder 150) include one or more proximity sensors coupled to a cross shaft of the lift arm 111.

The vehicle 102 also includes a fork assembly position sensor 106*b* arranged to detect the position of the fork assembly 113. For example, the fork assembly position sensor 106*b* can be used to detect the angle of the fork assembly 113 relative to the surface 190 on which the vehicle 102 is positioned. As described in further detail herein, the fork assembly position sensor 106*b* can be used to detect the angle of the fork assembly 113 as the vehicle 102 approaches a refuse container 130 to be emptied. Fork assembly position sensor 106*b* can include, but is not limited to, an analog sensor, a digital sensor, a CAN bus sensor, a magnetostrictive sensor, a RADAR sensor, a LIDAR sensor, a laser sensor, an ultrasonic sensor, an infrared (IR) sensor, a stereo camera sensor, a three-dimensional (3D) camera, in-cylinder sensors, or a combination thereof.

In some implementations, the distance 270 between the center of an end 126 of one or more forks 116 of the fork assembly 113 and the surface on which the vehicle 102 is located is determined by the one or more body sensors 106. For example, by determining the position of the lift arm 111 and the angle of the fork assembly 113 relative to the surface 190 on which the vehicle 102 is positioned, the distance 270 the center of an end 126 of one or more forks 116 of the fork assembly 113 and the surface 190 on which the vehicle 102 is positioned can be determined.

As depicted in FIG. 2, a container detection sensor 160 is arranged on the refuse collection vehicle 102 to detect the presence and position of a refuse container 130. For example, container detection sensor 160 can be configured to detect the position of one or more fork pockets 180 on a refuse container 130. In some implementations, the vehicle includes multiple container detection sensors 160 that detect the position of a refuse container 130. Multiple container detection sensors 160 can be implemented to provide redundancy in container 130 detection. The container detection sensors(s) 160 may also be placed in other positions and orientations. Container detection sensor(s) 160 can include, but are not limited to, an analog sensor, a digital sensor, a CAN bus sensor, a magnetostrictive sensor, a RADAR sensor, a LIDAR sensor, a laser sensor, an ultrasonic sensor, an infrared (IR) sensor, a stereo camera sensor, a three-dimensional (3D) camera, in-cylinder sensors, or a combination thereof.

In some examples, as depicted in FIG. 2, the container detection sensor 160 is a camera. The container detection sensor 160 can be oriented to capture images of the exterior of the vehicle 102 in the direction of travel of the vehicle 102. For example, the container detection sensor 160 can be configured to capture image data or video data of a scene external to and in proximity to the vehicle 102.

A computing device can receive one or more images from the camera container detection sensor 160 and process the one or more images using machine learning based image processing techniques to detect the presence of a refuse container 130 in the one or more images. For example, sensor 160 can be a camera, and images and/or video captured by the sensor 160 can be provided to a computing device, such as onboard computing device 112, for image processing. In some implementations, a computing device can receive an image from container detection sensor 160 and determine, based on machine learning image processing techniques, that the vehicle 102 is positioned within a sufficient distance to engage a refuse container 130. In some implementations, a video feed of the refuse container 130 is provided by the sensor 160 and transmitted to a computing device for machine learning based image processing techniques to detect the presence of a refuse container 130.

The data captured by sensor 160 can be further processed by the onboard computing device 112 to determine the location of various components of the detected refuse container 130. In some implementations, a computing device 112 receives images or video captured by the sensor 160 and uses machine learning based image processing techniques to determine the position of one or more fork pockets 180 on a refuse container 130. In some implementations, images captured by the sensor 160 are processed by a computing device 112 to detect the sides of one or more fork pockets 180 to determine one or more dimensions of each of the fork pockets 180, such as the height and width of each of the fork pockets 180. In some examples, a computing device can process images provided by sensor 160 to determine a location of one or more corners of the one or more fork pockets 180 of a detected refuse container 130. The detected corners of the fork pockets 180 can be provided as GPS coordinates, and based on these coordinates, the height and angular position of the fork pockets 180 relative to the surface 190 on which the vehicle 102 is positioned can be determined.

Once the position of the fork pockets 180 of a refuse container 130 are determined based on the image data captured by sensor 160, a signal conveying the position of the fork pockets 180 is transmitted to an onboard computing device 112 of the vehicle 102. In some implementations, the position of the fork pockets 180 is provided as GPS coordinates identifying the coordinates of the corners of each of the fork pockets 180. In some examples, the position of the fork pockets is provided as a height of the fork pockets relative to the surface 190 on which the vehicle 102 is positioned. In some implementations, the position of the fork pockets is provided as a height of the center of the fork pockets relative to the surface 190 on which the vehicle 102 is positioned.

In some implementations, the container detection sensor 160 includes one or more optical sensors. For example, container detection sensor 160 can include one or more analog ultrasonic sensors. In some implementations, container detection sensor 160 is an ultrasonic sensor and is configured to detect the presence of one or more fork pockets 180 of a refuse container 130. In some examples, container detection sensor 160 is an ultrasonic sensor and is configured to detect the height of the center of one or more fork pockets 180 relative to the surface 190 on which the vehicle is positioned. In some examples, container detection sensor 160 is an ultrasonic sensor and is configured to detect the angular position of one or more fork pockets 180 relative to the surface 190 on which the vehicle is positioned.

In some implementations, container detection sensor 160 transmits a signal conveying data indicating the position of the fork pockets 180 to an onboard computing device 112 of the vehicle 102. In some examples, container detection sensor 160 transmits a signal conveying data indicating the height of the center of one or more fork pockets 180 relative to the surface 190 on which vehicle 102 is positioned. In some implementations, onboard computing device 112 receives the data from an ultrasonic container sensor 160 and determines the position of the fork pockets 180 based on the data received from the sensor 160.

Upon receiving data describing the position of one or more fork pockets 180 of a refuse container 130 proximate the vehicle 102 collected by one or more container detection sensors 160, the position of the lift arm 111 and the fork assembly 113 of the vehicle 102 can be automatically adjusted to engage the detected refuse container 130. For example, the position of the lift arm 111 and the fork assembly 113 of the vehicle 102 can be automatically adjusted to align one or more ends 126 of the forks 116 of the fork assembly 113 with the detected fork pockets 180 of the detected refuse container 130. For example, the position of the lift arm 111 and the fork assembly 113 of the vehicle 102 can be automatically adjusted to align the height of the center of one or more ends 126 of the forks 116 of the fork assembly 113 with the height of the center of the detected fork pockets 180 of the detected refuse container 130. As previously discussed, the current position of the lift arm 111 and the angle of the fork assembly 113 relative to the surface 190 on which the vehicle 102 is positioned are determined based on data received from the body sensors 106. Based on this determination, the distance 270 between a center of the ends 126 of the forks 116 of fork assembly 113 and the surface 190 on which the vehicle 102 is located can be determined. In some examples, the computing device determines the GPS coordinates of the one or more ends 126 of the forks 116 of the fork assembly 113 based on data provided by the body sensors 106.

The computing device 112 can compare the position of the one or more ends of the forks 116 of the fork assembly 113 with the position of the one or fork pockets 180 of the refuse container 130 to determine adjustments to the lift arm 111 position and the fork assembly 113 angle necessary to align the forks 116 of the fork assembly 113 with the fork pockets 180. For example, the onboard computing device determines the adjustments to the lift arm 111 position and fork assembly 113 angle necessary to align the height of the center of the ends 126 of the forks 116 with the height of the center of the fork pockets 180. In some implementations, the onboard computing device determines the adjustments to the lift arm 111 position and fork assembly 113 angle necessary to align the center of the ends 126 of the forks 116 with the center of the fork pockets 180.

FIGS. 3A-3D depict the process of automatically positioning the body components 104 of a front loading refuse collection vehicle 102 in response to receiving a signal conveying the position of one or more fork pockets 180 of a refuse container 130.

Figure 3A:
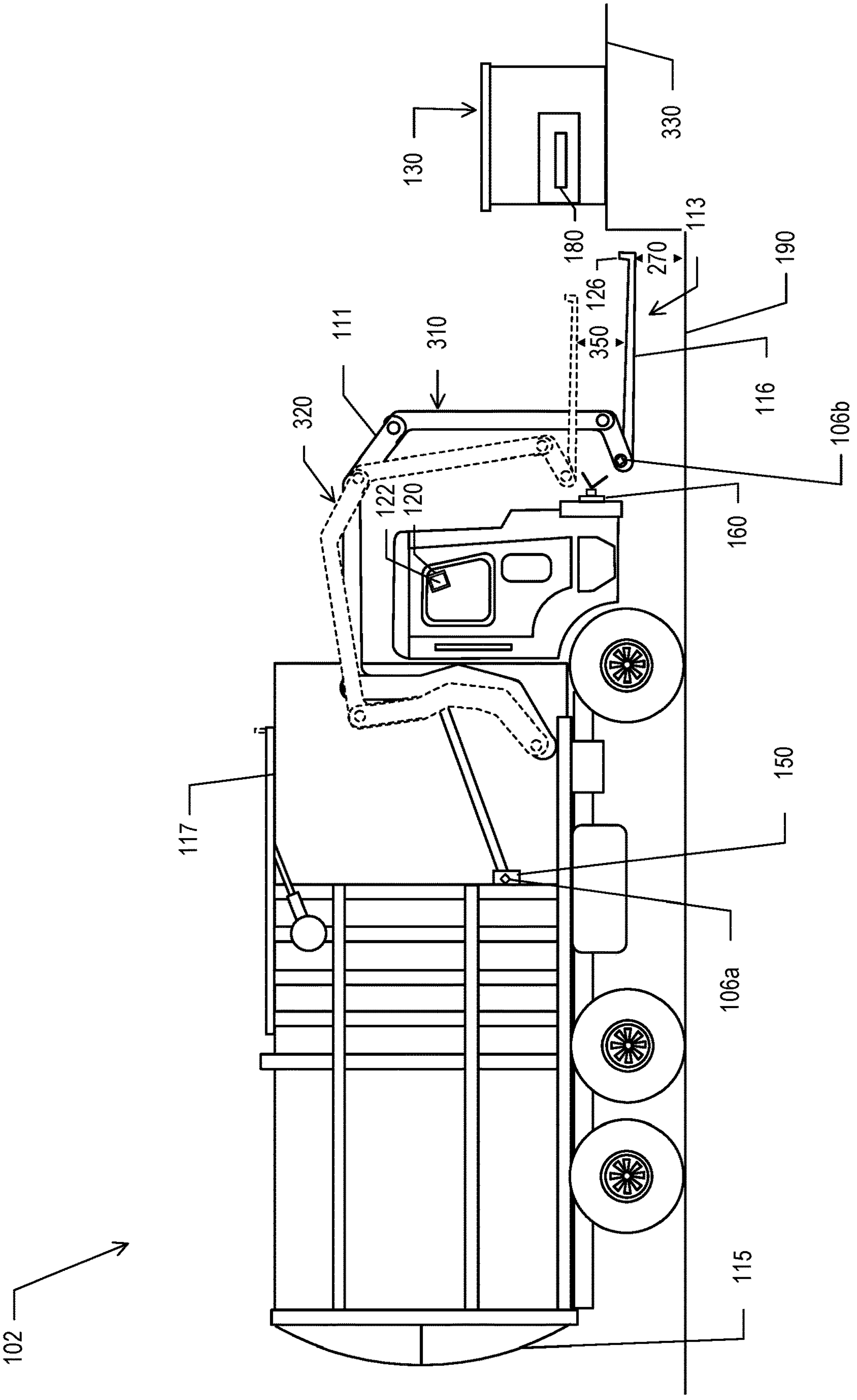
FIGS. 3A-3D depict example schematics of a refuse collection vehicle engaging a refuse container.

In FIG. 3A, the refuse container 130 is placed on an elevated surface 330 that is higher than the surface 190 that the vehicle 102 is positioned on such that the height of the fork pockets 180 is higher than the height of the ends 126 of the forks 116 of the fork assembly 113 upon approaching the container. The position of the fork pockets 180 is detected by the container detection sensor 160 and a signal conveying the position of the fork pockets 180 is conveyed to an onboard computing device of the vehicle 102. Using data provided by the body sensors 106, the current position of the fork assembly 113 relative to the surface 190 on which the vehicle 102 is positioned is determined by the onboard computing device and is compared to the fork pocket 180 position to determine a difference in height 350 between the position of the ends of the forks 116 and the fork pockets 180. In some implementations, the onboard computing device determines the difference in height 350 between the position of the center of each end 126 of the forks 116 and the center of each of the fork pockets 180. Based on the difference in height 350, the onboard computing device determines the adjustments to the position 310 of the lift arm 111 necessary to align the height of the center of the ends 126 of the forks 116 within the center of the fork pockets 180. Based on the determined difference in height 350, the lift arm 111 is automatically raised to the adjusted position 320 determined by the computing device. As depicted in FIG. 3A, by raising the lift arm 111 to the adjusted position 320 determined based on the initial position of the body components and the position of the fork pockets 180, the ends of the forks 116 of the fork assembly 113 are positioned at the same height as the detected fork pockets 180.

Figure 3B:
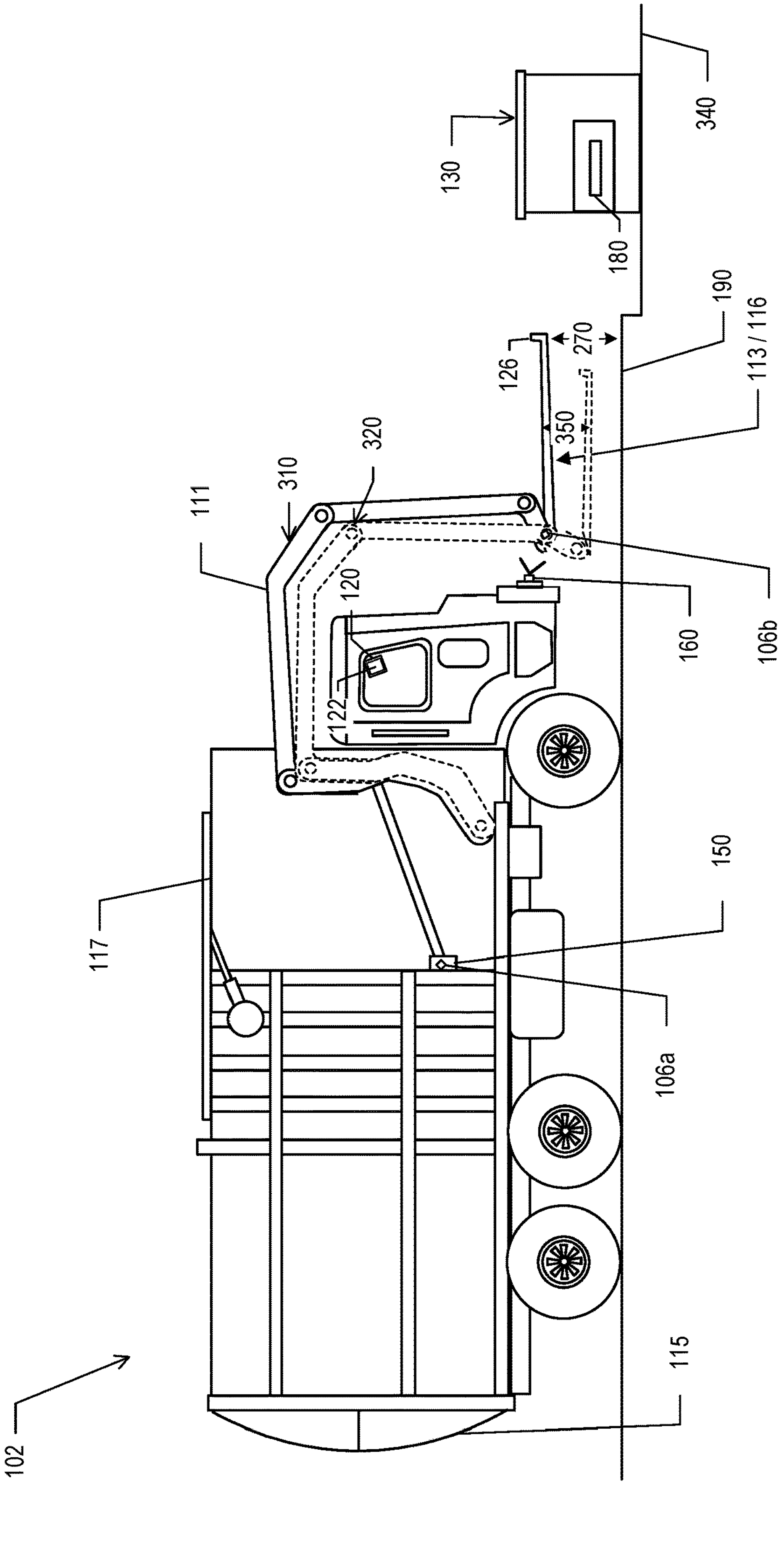

As depicted in FIG. 3B, the refuse container 130 can be placed on a surface 340 that is lower than the surface 190 that the vehicle 102 is positioned on such that the height of the fork pockets 180 is lower than the ends 126 of the forks 116 of the fork assembly 113 when the lift arm 111 is in an initial position 310 upon approaching the container 130. The position of the fork pockets 180 is detected by the container detection sensor 160 and a signal conveying the position of the fork pockets 180 is conveyed to an onboard computing device 112 of the vehicle 102, as described above. Upon receiving the position of the fork pockets 180, a difference in height 350 between the center of the ends 126 of the forks 116 of the fork assembly 113 and the center of the fork pockets 180 is determined by an onboard computing device of the vehicle 102 using the process described above. Based on determining the difference in height 350, the lift arm 111 is automatically lowered to an adjusted position 320 determined by the computing device. As depicted in FIG. 3B, by lowering the lift arm 111 to the adjusted position 320 determined based on the initial position of the body components and the position of the fork pockets 180, the center of the ends 126 of the forks 116 of the fork assembly 113 are positioned at the same height as the center of the detected fork pockets 180.

Figure 3C:
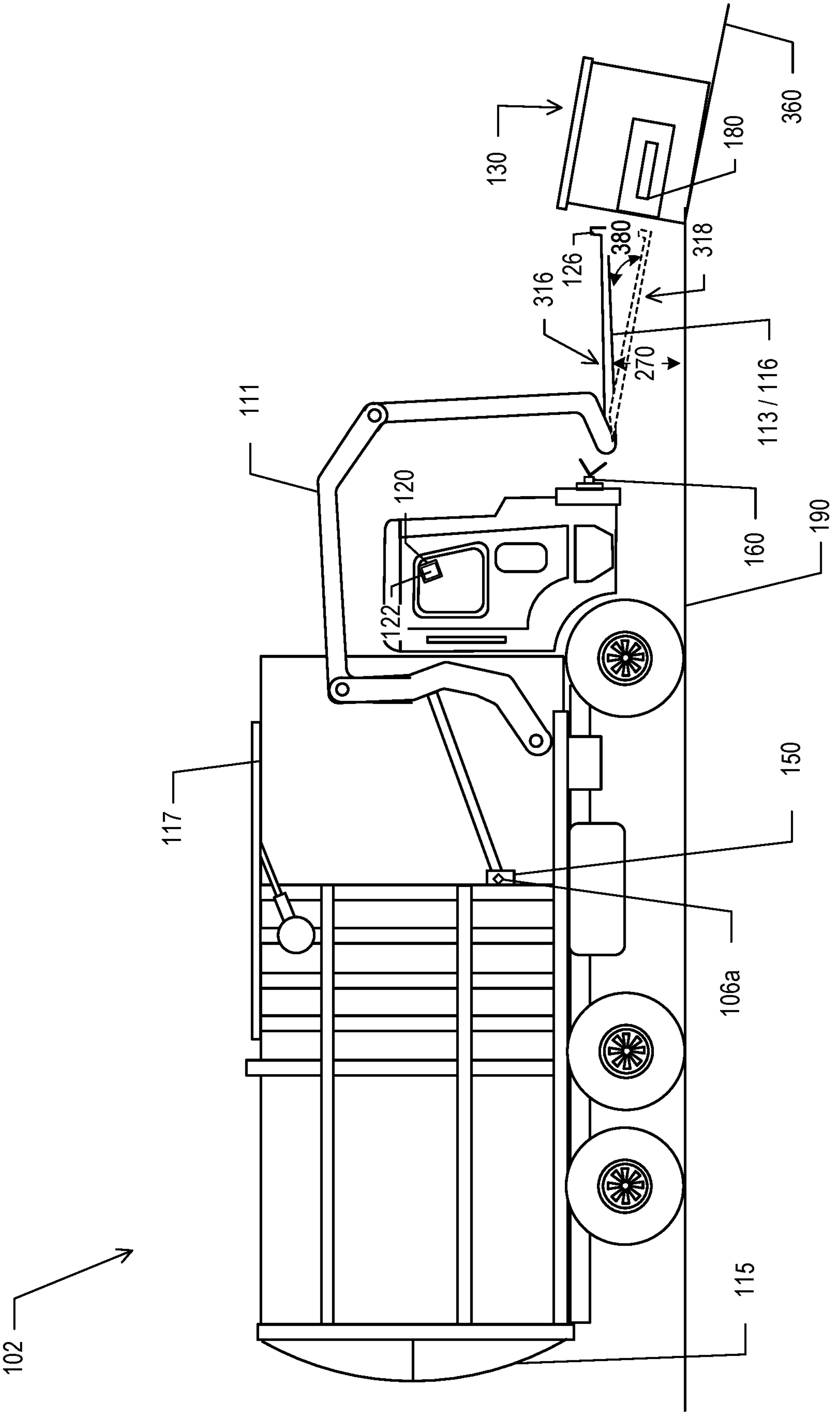

As depicted in FIG. 3C, the refuse container 130 can be placed on a surface 360 that slopes downwards from the surface 190 that the vehicle 102 is positioned on such that the fork pockets 180 are angled downward. The position and angle of the fork pockets 180 is detected by the container detection sensor 160 and a signal conveying the position and the angle of the fork pockets 180 is conveyed to an onboard computing device 112 of the vehicle 102, as described above. Upon receiving the angle and position of the fork pockets 180, a difference in the angle 380 of the forks 116 and the angle of the fork pockets 180 is determined by an onboard computing device of the vehicle 102 using the process described above. Based on determining the difference in angular position, the forks 116 of the fork assembly 113 are automatically tilted downward from a first position 316 to an adjusted position 318 determined by the computing device. As depicted in FIG. 3C, by rotating the forks 116 of the fork assembly 113 to the adjusted position 318 determined based on the initial position 316 of the forks 116 and the position of the fork pockets 180, the forks 116 of the fork assembly 113 are positioned at the same angle as the angle of the detected fork pockets 180.

Figure 3D:
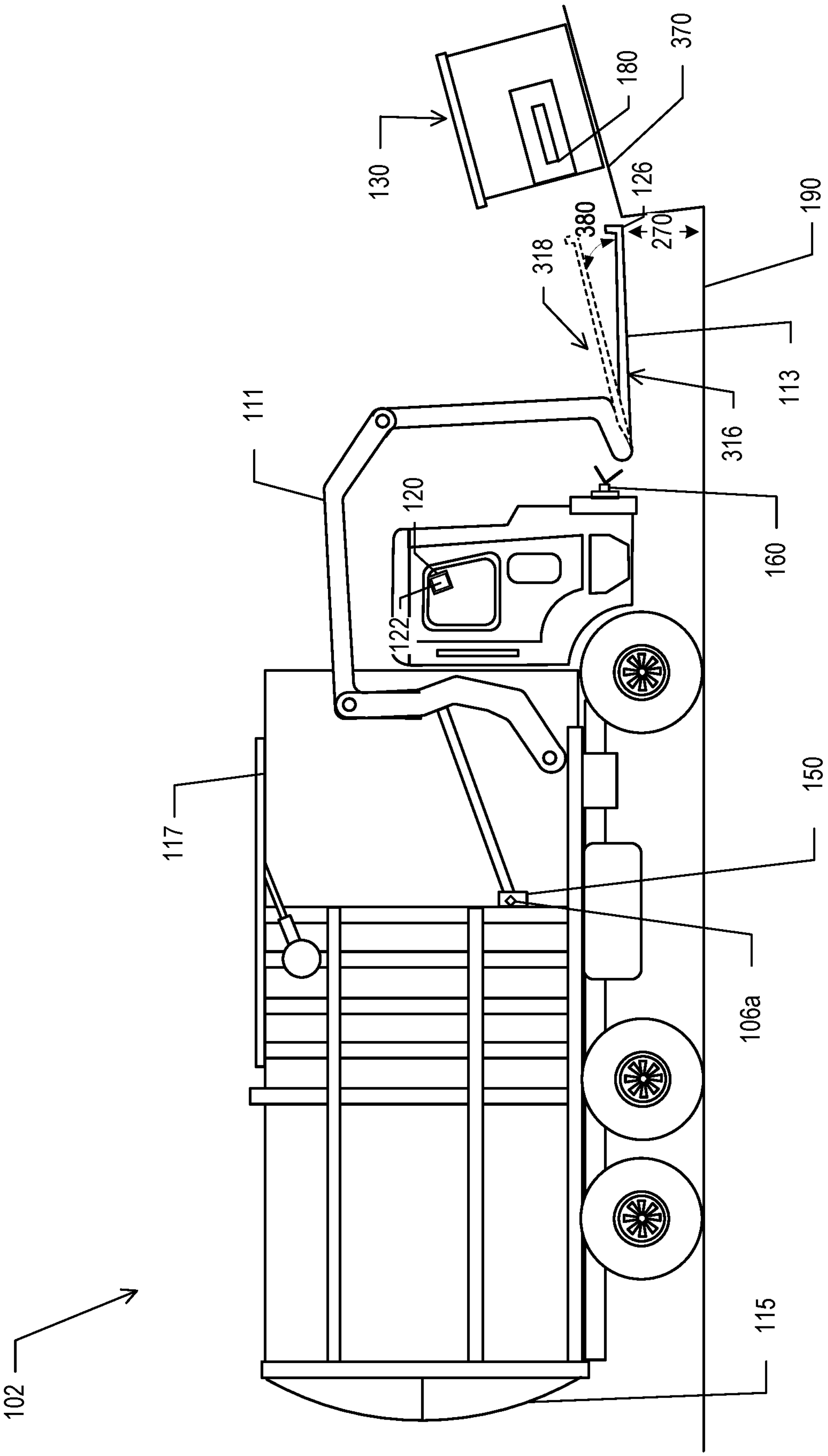

As depicted in FIG. 3D, the refuse container 130 can be placed on a surface 370 that slopes upwards from the surface 190 that the vehicle 102 is positioned on such that the fork pockets 180 are angled upward. The position and angle of the fork pockets 180 is detected by the container detection sensor 160 and a signal conveying the position of the fork pockets 180 is conveyed to an onboard computing device 112 of the vehicle 102, as described above. Upon receiving the angle and position of the fork pockets 180, a difference in the angle 380 of the forks 116 of the fork assembly 113 and the angle of the fork pockets 180 is determined by an onboard computing device of the vehicle 102 using the process described above. Based on determining the difference in angular position, the forks 116 of the fork assembly 113 are automatically tilted upward from a first position 316 to an adjusted position 318 determined by the computing device. As depicted in FIG. 3D, by rotating the forks 116 of the fork assembly 113 to the adjusted position 318 determined based on the initial position 316 of the forks 116 and the position of the fork pockets 180, the forks 116 of the fork assembly 113 are positioned at the same angle as the angle of the detected fork pockets 180.

In some examples, both the position of the lift arm 111 and the angle of the fork assembly 113 are adjusted in response to the onboard computing device 112 receiving data indicating a position of one or more fork pockets 180. For example, the position of the lift arm 111 and the angle of the fork assembly 113 can both be adjusted to accommodate for differences in both the height and the angle between the position of the forks 116 and the position of the fork pockets 180.

The automatic positioning of the body components 104 based on fork pocket 180 position data can be conducted automatically with minimal or no operator involvement. For example, the position of the lift arm 111 and the position of the fork assembly 113 can be automatically adjusted in response to the onboard computing device 112 receiving data indicating the position of one or more fork pockets 180. In some examples, the position of the lift arm 111 and the position of the fork assembly 113 are automatically adjusted based on receiving data indicating the position of one or more fork pockets 180 and in response to an operator of the vehicle manually engaging a switch to initiate a dump cycle. In some implementations, the switch to initiate the dump cycle is provided as one or more foot pedals positioned on the floorboard of the vehicle 102. U.S. patent application Ser. No. 16/781,857 filed Feb. 4, 2020 discloses foot pedals for initiating and controlling a dump cycle. The entire content of U.S. patent application Ser. No. 16/781,857 is incorporated by reference herein.

In some implementations, the position of the container 130, as determined based on the position of the fork pockets 180, at the time the dump cycle is initiated ("pick position") is recorded by the onboard computing device 112. At the end of the dump cycle, the container 130 can be automatically returned to a position that is within 1 inch of the recorded pick position. U.S. patent application Ser. No. 16/781,857 filed Feb. 4, 2020 discloses systems and methods for recording and returning refuse containers to pre-recorded pick positions. The entire content of U.S. patent application Ser. No. 16/781,857 is incorporated by reference herein.

Figure 4:
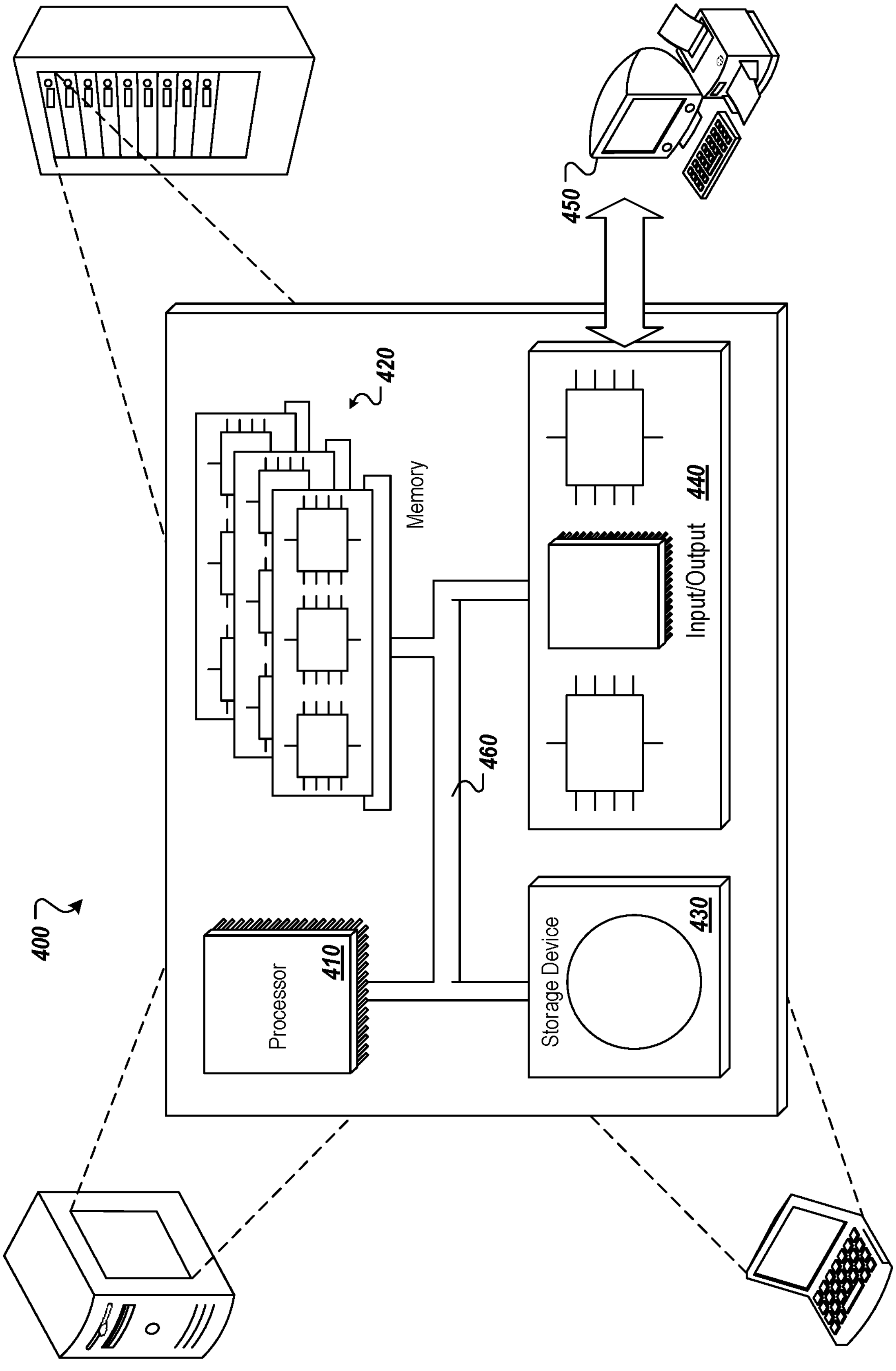
FIG. 4 depicts an example computing system.

FIG. 4 depicts an example computing system, according to implementations of the present disclosure. The system 400 may be used for any of the operations described with respect to the various implementations discussed herein. For example, the system 400 may be included, at least in part, in one or more of the onboard computing device 112, and/or other computing device(s) or system(s) described herein. The system 400 may include one or more processors 410, a memory 420, one or more storage devices 430, and one or more input/output (I/O) devices 450 controllable via one or more I/O interfaces 440. The various components 410, 420, 430, 440, or 450 may be interconnected via at least one system bus 460, which may enable the transfer of data between the various modules and components of the system 400.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claim(s).

What is claimed is:

1. A refuse collection vehicle comprising:

a fork assembly including one or more forks configured to engage one or more respective fork pockets of a refuse container;

a lift arm coupled to the fork assembly, the lift arm operable to lift the refuse container while the fork assembly is engaged with the one or more fork pockets;

at least one position sensor configured to collect data indicating a positioning of the lift arm relative to a surface on which the refuse collection vehicle is positioned;

at least one container detection sensor configured to generate sensor data describing the one or more fork pockets of the refuse container, wherein the one or more forks are rotatable, about an axis parallel to the surface on which the refuse collection vehicle is positioned, relative to the at least one container detection sensor and the surface on which the refuse collection vehicle is positioned; and a computing device communicatively coupled to the fork assembly and the lift arm, the computing device programmed to perform operations comprising:

receiving the sensor data describing the one or more fork pockets of the refuse container;

analyzing the sensor data to determine a position of each fork pocket;

determining, by the computing device, a positioning of the lift arm relative to the surface on which the refuse collection vehicle is positioned based on the data provided by the at least one position sensor arranged to collect data indicating the positioning of the lift arm;

determining, by the computing device, a height of one or more ends of one or more forks of the fork assembly relative to the surface on which the refuse collection vehicle is positioned based on the positioning of the lift arm relative to the surface on which the refuse collection vehicle is positioned;

determining, by the computing device, an amount and a direction of travel of the lift arm required to align the one or more ends of the one or more forks with the position of each fork pocket of the one or more fork pockets based on the height of the one or more ends of the one or more forks and the position of each fork pocket of the one or more fork pockets; and moving the lift arm in the determined amount and the determined direction of travel.

2. The refuse collection vehicle of claim 1, wherein the computing device is programmed to perform operations comprising automatically adjusting a positioning of the lift arm relative to the surface on which the refuse collection vehicle is positioned.

3. The refuse collection vehicle of claim 1, wherein the operations further comprise adjusting an angular position of at least one of the one or more forks of the fork assembly relative to the surface on which the refuse collection vehicle is positioned.

4. The refuse collection vehicle of claim 1, wherein the at least one container detection sensor comprises at least one of a camera or an analog ultrasonic sensor.

5. The refuse collection vehicle of claim 1, wherein:

the sensor data describing the one or more fork pockets of the refuse container comprises data indicating a position of two or more sides of each fork pocket of the one or more fork pockets; and the operations further comprise determining the position of the center of each fork pocket of the one or more fork pockets based on the position of the two or more sides of the respective fork pocket.

6. The refuse collection vehicle of claim 1, wherein the operations further comprise:

rotating the one or more forks relative to the at least one container detection sensor.

7. The refuse collection vehicle of claim 1, wherein the lift arm is rotatable relative to the at least one container detection sensor and the surface on which the refuse collection vehicle is positioned.

8. A method of operating a refuse collection vehicle to collect refuse from a refuse container, the method comprising:

receiving, by at least one processor, sensor data describing one or more fork pockets of the refuse container, wherein the refuse collection vehicle comprises at least one container detection sensor configured to generate the sensor data;

analyzing the sensor data describing the one or more fork pockets of the refuse container to determine a position of each fork pocket;

determining, by the at least one processor, a positioning of a lift arm of the refuse collection vehicle relative to a surface on which the refuse collection vehicle is positioned based on data provided by one or more body sensors;

determining, by the at least one processor, a height of one or more ends of one or more forks of a fork assembly of the refuse collection vehicle relative to the surface on which the refuse collection vehicle is positioned based on the positioning of the lift arm relative to the surface on which the refuse collection vehicle is positioned, wherein the one or more forks are rotatable, about an axis parallel to the surface on which the refuse collection vehicle is positioned, relative to the at least one container detection sensor and the surface on which the refuse collection vehicle is positioned;

determining, by the at least one processor, an amount and a direction of travel of the lift arm required to align the one or more ends of the one or more forks with the position of each fork pocket of the one or more fork pockets based on the height of the one or more ends of the one or more forks and the position of each fork pocket of the one or more fork pockets; and transmitting, by at least one processor, a signal to cause the lift arm to move the determined amount and the determined direction of travel.

9. The method of claim 8, wherein transmitting, by the at least one processor, a signal to cause the lift arm to move the determined amount and the determined direction of travel comprises transmitting, by the at least one processor, a signal to cause a positioning of the lift arm to be adjusted relative to the surface on which the refuse collection vehicle is positioned.

10. The method of claim 8, further comprising transmitting, by the at least one processor, a signal to cause an angular position of one or more forks of the fork assembly to be adjusted relative to the surface on which the refuse collection vehicle is positioned.

11. The method of claim 8, wherein:

the sensor data describing one or more fork pockets of the refuse container comprises data indicating a position of two or more sides of each fork pocket of the one or more fork pockets; and the method further comprises determining the position of the center of each fork pocket of the one or more fork pockets based on the position of the sides of the respective fork pocket.

12. A refuse collection vehicle comprising:

a fork assembly including one or more forks configured to engage one or more respective fork pockets of a refuse container;

a lift arm coupled to the fork assembly, the lift arm operable to lift the refuse container while the fork assembly is engaged with the one or more fork pockets;

at least one position sensor configured to collect data indicating an angular position of the fork assembly relative to a surface on which the refuse collection vehicle is positioned;

at least one container detection sensor configured to generate sensor data describing the one or more fork pockets of the refuse container, wherein the one or more forks are rotatable, about an axis parallel to the surface on which the refuse collection vehicle is positioned, relative to the at least one container detection sensor and the surface on which the refuse collection vehicle is positioned; and a computing device communicatively coupled to the fork assembly and the lift arm, the computing device programmed to perform operations comprising:

receiving the sensor data describing the one or more fork pockets of the refuse container;

analyzing the sensor data to determine an alignment angle to align at least one of the one or more forks with a respective fork pocket;

determining, by the computing device, an angular position of one or more forks of the fork assembly relative to the surface on which the refuse collection vehicle is positioned based on the data provided by the at least one position sensor arranged to collect data indicating the angular position of the fork assembly;

determining, by the computing device, an amount and a direction of rotation of the fork assembly required to align the one or more forks of the fork assembly with the fork pockets based on the angular position of one or more forks of the fork assembly relative to the surface on which the refuse collection vehicle is positioned and the determined alignment angle; and rotating the fork assembly in the determined amount and the determined direction of rotation.

13. The refuse collection vehicle of claim 12, wherein the operations further comprise adjusting a positioning of the lift arm relative to the surface on which the refuse collection vehicle is positioned.

14. The refuse collection vehicle of claim 12, wherein rotating the fork assembly in the determined amount and the determined direction of rotation comprises adjusting an angular position of at least one of the one or more forks of the fork assembly relative to the surface on which the refuse collection vehicle is positioned.

15. The refuse collection vehicle of claim 12, wherein the at least one container detection sensor comprises at least one of a camera or an analog ultrasonic sensor.

16. The refuse collection vehicle of claim 12, wherein:

the at least one container detection sensor configured to collect sensor data describing the one or more fork pockets of the refuse container is configured to detect a position of two or more sides of each fork pocket of the one or more fork pockets; and the operations further comprise determining the position of the center of each fork pocket of the one or more fork pockets based on the position of the two or more sides of the respective fork pocket.

17. A method of operating a refuse collection vehicle to collect refuse from a refuse container, the method comprising:

receiving, by at least one processor, sensor data describing one or more fork pockets of the refuse container, wherein the refuse collection vehicle comprises at least one container detection sensor configured to generate the sensor data;

analyzing the sensor data to determine an alignment angle to align at least one fork of a fork assembly of the refuse collection vehicle with a respective fork pocket;

determining, by the at least one processor, an angular position of one or more forks of the fork assembly relative to a surface on which the refuse collection vehicle is positioned based on data provided by one or more body sensors, wherein the one or more forks are rotatable, about an axis parallel to the surface on which the refuse collection vehicle is positioned, relative to the at least one container detection sensor and the surface on which the refuse collection vehicle is positioned;

determining, by the at least one processor, an amount and a direction of rotation of the fork assembly required to align the one or more forks of the fork assembly with the one or more fork pockets based on the angular position of one or more forks of the fork assembly relative to the surface on which the refuse collection vehicle is positioned and the determined alignment angle; and transmitting, by the at least one processor, a signal to cause rotation of the fork assembly in the determined amount and the determined direction of rotation.

18. The method of claim 17, further comprising transmitting, by the at least one processor, a signal to cause a positioning of a lift arm of the refuse collection vehicle to be adjusted relative to the surface on which the refuse collection vehicle is positioned.

19. The method of claim 17, wherein transmitting, by the at least one processor, a signal to cause rotation of the fork assembly in the determined amount and the determined direction of rotation comprises transmitting, by the at least one processor, a signal to cause an angular position of one or more forks of the fork assembly to be adjusted relative to the surface on which the refuse collection vehicle is positioned.

20. The method of claim 17, wherein:

the sensor data describing one or more fork pockets of the refuse container includes data indicating a position of two or more sides of each fork pocket of the one or more fork pockets; and the method further comprises determining the position of the center of each fork pocket of the one or more fork pockets based on the position of the sides of the respective fork pocket.

* * * * *